United States Patent [19]

Matsubara et al.

[11] 3,928,021

[45] Dec. 23, 1975

[54] PROCESS OF REDUCING IRON ORES

[75] Inventors: Kenji Matsubara, Yokohama; Shigeo Kanbara, Chigasaki, both of Japan

[73] Assignee: Nippon Kokan Kabushiki Kaisha, Tokyo, Japan

[22] Filed: Dec. 14, 1973

[21] Appl. No.: 424,915

Related U.S. Application Data

[63] Continuation-in-part of Ser. No. 210,434, Dec. 21, 1971, abandoned.

[30] Foreign Application Priority Data

Dec. 28, 1970 Japan............................. 45-120075

[52] U.S. Cl........................................ 75/35; 75/26
[51] Int. Cl.²....................................... C21B 13/02
[58] Field of Search ........................ 75/26, 34, 35, 9

[56] References Cited
UNITED STATES PATENTS 3,019,100   1/1962   Robson................................... 75/26
3,776,533   12/1973   Vlnaty ................................. 75/26 X Primary Examiner—M. J. Andrews
Attorney, Agent, or Firm—William Anthony Drucker

[57] ABSTRACT

An improvement in the fluidized bed process for composite pellets blended with iron ore and solid reducing agents wherein the off-gas produced in the fluidized bed is fed to a first heat-exchanger to heat-exchange the air by means of the thermal energy thereof, and one portion of the thus heat-exchanged hot air is fed to the fluidized bed and another portion is fed to the gasifying furnace, and said off-gas is subsequently fed to preheat said composite pellets, and thermal energy of the gas from the upper part of the cooling bed is utilized in a second heat-exchanger to preheat oil and is further fed to cool the product pellets.

4 Claims, 1 Drawing Figure

U.S. Patent   Dec. 23, 1975   3,928,021
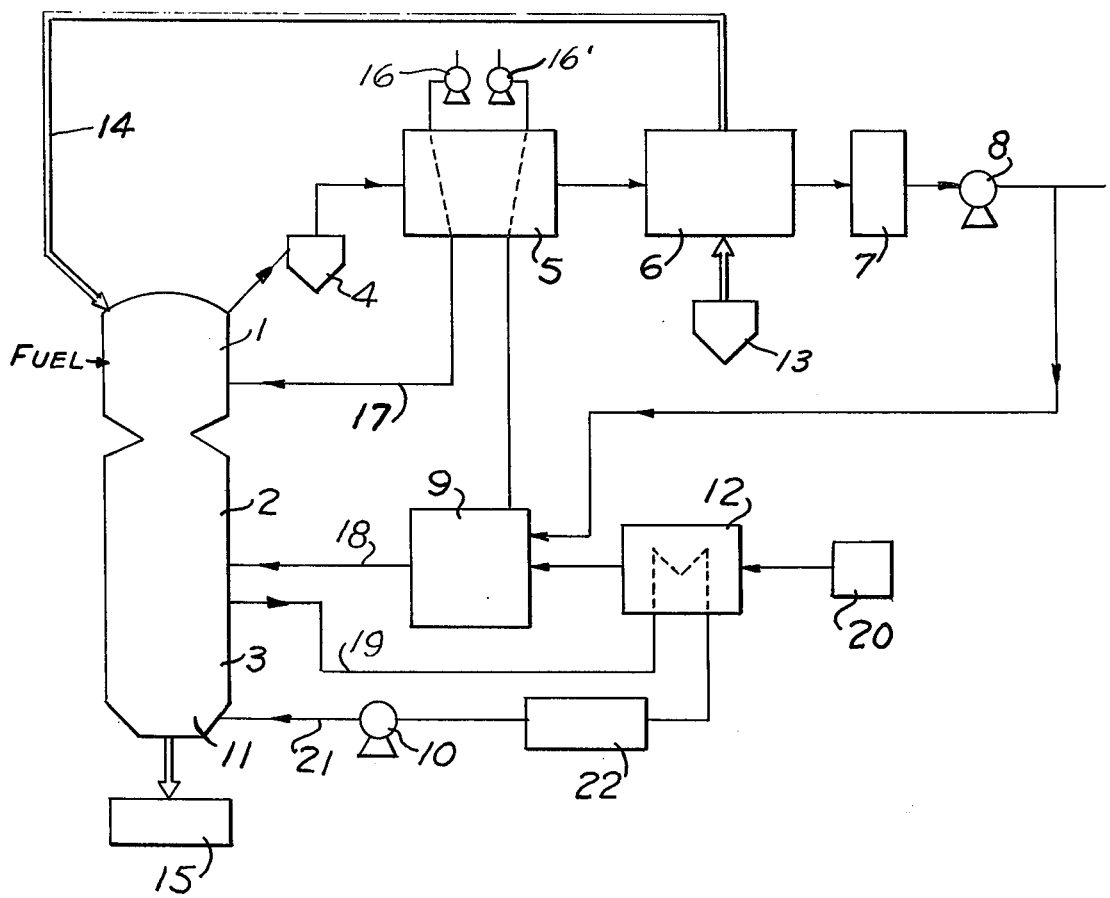

PROCESS OF REDUCING IRON ORES

The present application is a continuation-in-part of our copending application Ser. No. 210,434 filed Dec. 21, 1971 now abandoned.

STATEMENT OF THE INVENTION

This invention relates to a process for directly reducing composite pellets, and more particularly to an effective utilization of the thermal energy produced in a fluidized bed of the process.

In recent years, many studies on the direct reducing process of iron ores have been carried into effect and the majority of said studies have been put into practice. For example, the Nu-Iron Process, H-Iron Process, Fior Process, and Novalfer-Onia Process are well known as fluidized bed direct reducing processes. The common characteristic of these fluidized bed processes may be found in the blowing of gaseous reducing agents into said fluidized bed. On the other hand, the use of composite pellet-like masses composed of iron ores and solid reducing agent is brought forward as a new type fluidized bed process. This process using composite pellet-like masses is different from the above mentioned processes in which a gaseous reducing agent is used. A weak-point of said fluidized bed process may be found in the utilization of thermal energy which is not perfect, that is, the thermal efficiency is low for practical operation.

This present invention has been developed to provide a fluidized bed process using composite pellets. The features of this invention lie in making use of the thermal energy from the elevated temperature off-gas produced in the fluidized bed to the highest degree as a multi-purpose thermal source, i.e., preheating the air to be fed to the fluidized bed and to a gasifying furnace, and further preheating said pellets. The thermal energy of the gas from the upper part of the cooling bed is utilized to preheat oil and this gas deprived of said thermal energy is further fed to cool the product pellet.

Thus, an object of this invention is to provide an improved fluidized bed process for composite pellets utilizing the thermal energy produced in said bed to the highest degree.

Another object of this invention is to provide an improved fluidized bed process where it is not required to use an external thermal source after starting the reducing reaction and being capable of automatic operation at a constant high temperature.

Other objects and advantages will be apparent from the following description with reference to the accompanying drawing in which:

The FIGURE of the drawing is a schematic representation of the present process.

Composite pellets used in this invention are mixed together, with iron ores and solid reducing agents such as coal, coke and the like. Said solid reducing agents are mixed so as to remove the stoichiometeric oxygen content in the iron oxide. In such a case the pellet should be fully dried and the size should be limited within the range of 1mm to 15mm, because a smaller than 1mm pellet tends to being about sintering and a larger than 15mm pellet shows a tendency to stop fluidization of said bed and practical operation becomes unstable.

The fluidization is carried out at a high temperature by blowing the preheated air to effect combustion of the combustible gas generated from the pellets and a portion of the combustible gas is blown from the lower part of the fluidized bed. Said fluidized bed temperature should be kept within the range of 800° to 1100°C. Such range exhibits the best effective reducing reaction. That is, at lower than 800°C the reducing reaction of the pellets becomes slow, and at higher than 1,100°C sticking or sintering of the pellets tends to be brought about.

Under the above-mentioned conditions, the present process is described with reference to the accompanying drawing.

A reactor vessel has, in vertically descending order, a fluidised bed 1, a moving bed 2, and a cooling bed 3. Now, elevated temperature off-gas produced in said fluidized bed 1 is introduced to a cyclone 4 to remove fine particles therefrom, and then is led to a first heat-exchanger 5 in order to effect heat exchange with the air therein. The preheated hot air from the outside is injected into said fluidized bed 1 through piping 17 by means of a blower 16. Such a system is one of the features of this process and it makes it possible to keep the required temperature and reducing reaction conditions in said fluidized bed.

In the above heat-exchanger 5, other heat-exchanging occurs. Heat exchanged hot air is fed to a gasifying furnace 9 by means of another blower 16', wherein heavy oil which has been preheated in heat exchanger 12 is gasified. Then the gasified heavy oil, i.e., reducing gas is blown into said moving bed 2 through piping 18. The blown reducing gas has an upward flow and contributes to the reducing reaction of the pellets falling from said fluidized bed 1 and at the same time the upward flow of said reducing gas contributes to fluidization of said pellet as well as said hot air blown through said piping 17. Such feeding system is a secondary feature of this process.

The third feature of this process is found in the circulating system composed of the upper part of said cooling bed 3, piping 19, another heat exchanger 12, a cooler 22, a blower 10, piping 21 and a lower portion 11 of the cooling bed 3. In such a system, hot off-gas is fed to said heat exchanger 12 through said piping 19 in order to preheat said heavy oil passing through a pump 20, which heavy oil is introduced to the gasifying furnace 9. Then, off-gas from the cooling bed which has become cool by said preheating is further cooled down with a cooler 22 and is blown into said portion 11 of said cooling bed 3 through piping 21 by said blower 10 to cool the reduced pellet-like masses. Finally, the cooled pellet-like masses are discharged in a receiver 15 and transferred to another place.

The elevated temperature off-gas passing through said heat exchanger 5 is introduced to a pre-heater 6 for green composite pellets from a feeder 13. Thus the pre-heated pellets are charged into said fluidized bed 1 through a feeding system 14. On the other hand, said off-gas from said preheated 6 is cooled with a washer 7 and is led to a suitable holder (not shown in the drawing) through a blower 8.

The above-mentioned system is operated automatically and continuously without any external thermal source, because said solid reducing agents blended with the iron ores and reducing gas are fired in turn, as green pellets are charged into said fluidized bed.

An example of operation of the above-mentioned process is a follows:

Ingredient of composite pellet used, which is charged into feeder 13 — preheater 6 — Piping 14:

Composite pellet: 1970 Kg/t.Fe
Total Fe: 51.5%
C: 19.22%
blending ratio of coal: 25.26%
pre-heating temperature of said pellets: about 300°C
off-gas temperature in preheater: about 450°C
Off-gas from said fluidized bed 1:
flow rate: about 3076.3 Nm³/t.Fe.
temperature: about 1,080°C
Hot air blown into the fluidized bed 1 which passes through the first heat exchanger 5:
temperature: about 900°C
flow rate: about 1432 Nm³/t.Fe.
Hot air introduced to the gasifying furnace 9:
temperature: about 900°C
flow rate: about 624.7 Nm³/t.Fe.
Reducing gas produced in the gasifying furance 9 and blown into the moving bed 2:
temperature: about 1,200°C
composition:
  CO: 22.64%
  $CO_2$: 1.69%
  $H_2$: 19.33%
  $N_2$: 51.5%
  $H_2S$: 0.22%
  $H_2O$: 4.55%
Heavy oil introduced to the gasifying furnace 9 through the second heat exchanger 12 from the pump 20: about 150Kg
Reduced pellet is discharged into a receiver 15 after cooling in the cooling bed 3 by cold gas:
weight: 1144Kg/t.Fe
composition:
  Total Fe: 87.40%
  Metallic Fe: 78.64%
Waste gas discharged by the blower 8 after washing in the washer 7:
composition:
  CO: 21.00%
  $CO_2$: 10.23%
  $H_2$: 9.26%
  $N_2$: 56.15%
  $H_2S$: 0.13%
  $H_2O$: 3.23%

As described in detail, it will be well-understood that utilization of thermal energy produced in the fluidized bed and the moving bed is put into effect to the highest degree.

The applicants further developed their investigations to effect improvements for curtailing fuel consumption. One of those investigations was to directly feed one portion of the gasifying fuel to lower the fuel amount. This case is characterized in that the heat lost is less than that of a case providing gasification from outside, and further impediments are by fat lower than in the case of blowing it into a moving bed. The fuel may be blown to the moving bed with one portion of the fuel preheated in the heat exchanger 12 or with a cold one from the outside of the proposed line. Another alternative is to feed one portion of the off-gas to the gasifying furnace to lower the consumption amount of the reducing gas, thereby to effectively make use of the still available ingredient in the off-gas as well as to maintain a temperature appropriate for blowing the reducing gas. In this connection, the rest of the off-gas can be, of course, utilized for various heat sources.

The following Example show the respective effects in that the fuel was directly fed to the moving bed, the off-gas was recycled thereto, and the combination thereof.

Iron ore: Magnetite (Peru)
Coal: weak coking coal (Australia)
Mixing ratio: Iron ore: 80% Coal 20% Bentonite: 0.5% (Total Fe: 54.9% C: 15.0%)
Preheated pellet:
  Amount 1858 Kg/t
  Temperature: 350°C
  Diameter: 8 to 11 mm
Fluidized bed temperature: 1080°C
Moving bed temperature (lower part) : 1000°C
Reducing gas blowing temperature: 1100°C
Preheating air temperature: 600°C
Results under four sets of conditions

|  | I | II | III | IV |
|---|---|---|---|---|
| A. Off-Gas recycle (Nm³/t) | 0 | 0 | 124 | 86 |
| B. Fuel for fluidized bed (Kg/t) | 0 | 40 | 0 | 39 |
| 1. Heavy oil for reducing gas (Kg/t) | 159 | 109 | 143 | 99 |
| 2. Air for reducing gas (Nm³/t) | 680 | 466 | 579 | 400 |
| 3. Amount of reducing gas (Nm³/t) | 1021 | 700 | 1014 | 700 |
| 4. Air for fluidized bed (Nm³/t) | 1023 | 1170 | 1024 | 1167 |
| 5. Amount of off gas (Nm³/t) | 2595 | 2511 | 2587 | 2505 |
| 6. Total amount of heavy oil (Kg/t) | 159 | 149 | 143 | 138 |
| 7. Total amount of air (Nm³/t) | 1703 | 1636 | 1603 | 1567 |
| 8. Total heat consumption (×10⁶ Kcal/t) | 4.36 | 4.26 | 4.19 | 4.14 |
| 9. Heat available outside this system (×10⁶ Kcal/t) | 1.35 | 1.31 | 1.24 | 1.23 |
| 10. (8) − (9) (×10⁶ Kcal/t) | 3.01 | 2.95 | 2.95 | 2.91 |

Composition of gases:

|  | CO | $CO_2$ | $H_2$ | $N_2$ | $H_2O$ |
|---|---|---|---|---|---|
| Reducing gas | 24 | 2 | 19 | 52 | 3 (%) |
| Off gas | 18 | 12 | 8 | 52 | 10 |

We claim:
1. A fluidized bed process for the direct reduction of iron ores comprising:
providing a vertical reactor vessel through which ore will fall during reduction and having arranged in vertically descending order a fluidized bed zone, an intermediate zone and a cooling zone;

pelletizing and drying a blend of iron ore and solid reducing agent to provide pellets having a diameter of between 1mm to 15mm;

charging the dried pellets into the fluidized bed zone of said vessel wherein said pellets are fluidized;

maintaining the temperature of said fluidized bed zone within the range of 800°C to 1100°C to thereby reduce the iron ore and to produce a first hot off-gas;

transferring said hot off-gas to a first heat exchanger;

feeding air to said first heat exchanger to obtain hot air;

feeding a portion of said hot air to said fluidized bed zone in order to fluidize the pellets and effect combustion of reductants;

feeding another portion of said hot air to a gasifying furnace to gasify preheated oil therein to produce a reducing gas;

blowing said reducing gas into said intermediate zone of the vessel below the fluidized bed zone, whereby the upward flow of said reducing gas will contribute to fluidization of the pellets in the fluidized bed zone and enhance the reduction of the iron ore of the pellets;

removing a second off-gas from the upper portion of the cooling zone immediately below the intermediate zone;

transferring said second off-gas to a second heat exchanger to heat additonal air being fed to said gasifying furnace and thereby cooling said second off-gas;

further cooling the cooled second off-gas from the second heat exchanger;

blowing the twice cooled second off-gas to the lower portion of the cooling zone to cool the reduced pellets; and discharging the cooled reduced pellets into a receiver.

2. A fluidized bed process according to claim 1 wherein said solid reducing agent is coal or coke.

3. A fluidized bed process according to claim 1 wherein the first off-gas from the fluidized bed contains dust, said process including the step of cleaning the first-off gas by removing the dust prior to being transferred to the first heatexchanger, the cleaned and cooled off-gas then being heated and recycled to the fluidized bed zone.

4. In a fluidized bed process, as claimed in claim 1, including the steps of preheating the composite pellets with the first off-gas from the fluidized bed before feeding the pellets to the reactor vessel, and then washing and discharging said first off-gas.

* * * * *